United States Patent
Kurose

(10) Patent No.: US 9,262,703 B2
(45) Date of Patent: Feb. 16, 2016

(54) IMAGE PROCESSING DEVICE

(71) Applicant: RISO KAGAKU CORPORATION, Minato-ku, Tokyo (JP)

(72) Inventor: Tsutomu Kurose, Tsukuba (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/622,032

(22) Filed: Feb. 13, 2015

(65) Prior Publication Data
US 2015/0242725 A1    Aug. 27, 2015

(30) Foreign Application Priority Data
Feb. 24, 2014    (JP) .................................. 2014-032857

(51) Int. Cl.
G06K 15/02    (2006.01)
(52) U.S. Cl.
CPC .......... *G06K 15/186* (2013.01); *G06K 15/1823* (2013.01)
(58) Field of Classification Search
USPC ................. 358/1.13, 1.16, 1.15, 1.18, 1.2
See application file for complete search history.

(56) References Cited

U.S. PATENT DOCUMENTS

| 8,810,813 B2 * | 8/2014 | Hayakawa | ............ 358/1.13 |
| 2012/0287444 A1 * | 11/2012 | Osada | ........ H04N 1/00068 358/1.2 |
| 2014/0063548 A1 * | 3/2014 | Nagai | ........ G06K 15/1886 358/1.15 |

FOREIGN PATENT DOCUMENTS

JP    2010277466 A    12/2010

* cited by examiner

*Primary Examiner* — Allen H Nguyen
(74) *Attorney, Agent, or Firm* — Holtz, Holtz & Volek PC

(57) ABSTRACT

An image processing device determines whether or not a data size per page of a received print job is greater than a preset threshold. When it is determined that the data size is greater than the threshold, the image processing device estimates a first RIP time per page, which is the time required to RIP process when a resolution of an image of the print job is not optimized, an optimization time per page, which is the time required to optimize, and a second RIP time per page when the resolution of the image of the print job is optimized. Then, the image processing device optimizes the resolution of the image of the print job on the basis of the first RIP time, the optimization time, and the second RIP time so that the rates of decreasing the resolution in each image after conversion are substantially the same.

2 Claims, 15 Drawing Sheets

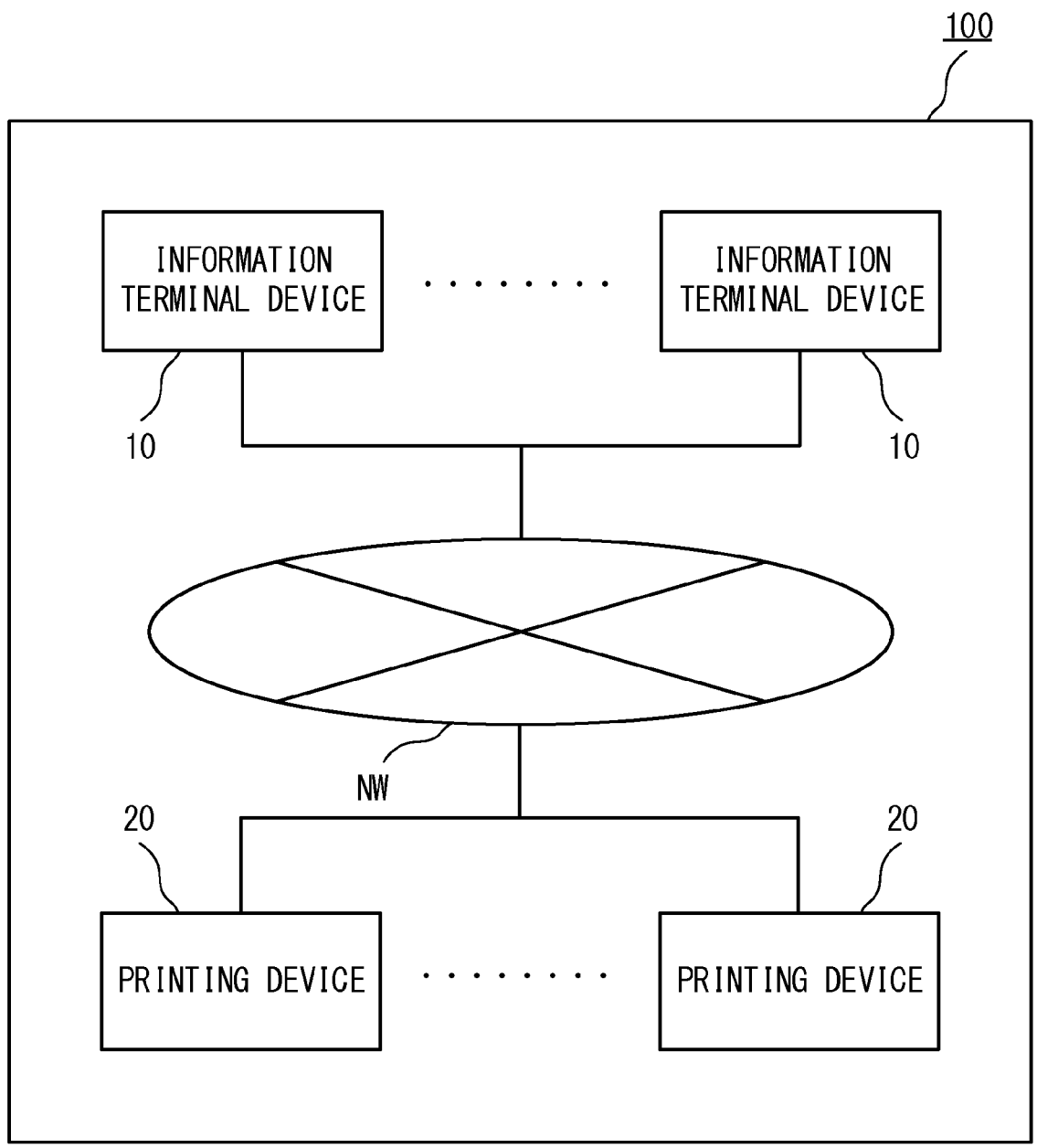
F I G. 1

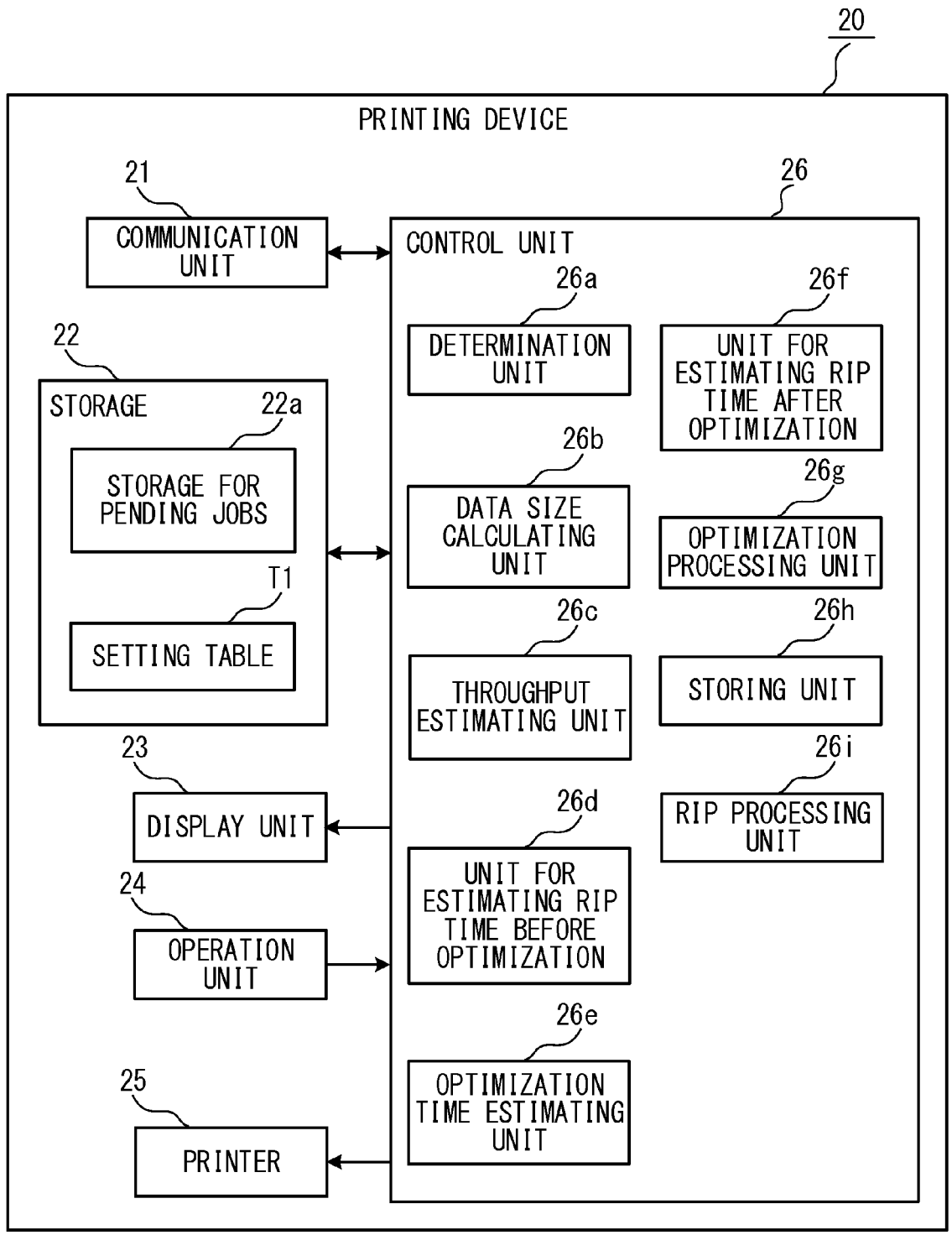
F I G. 2

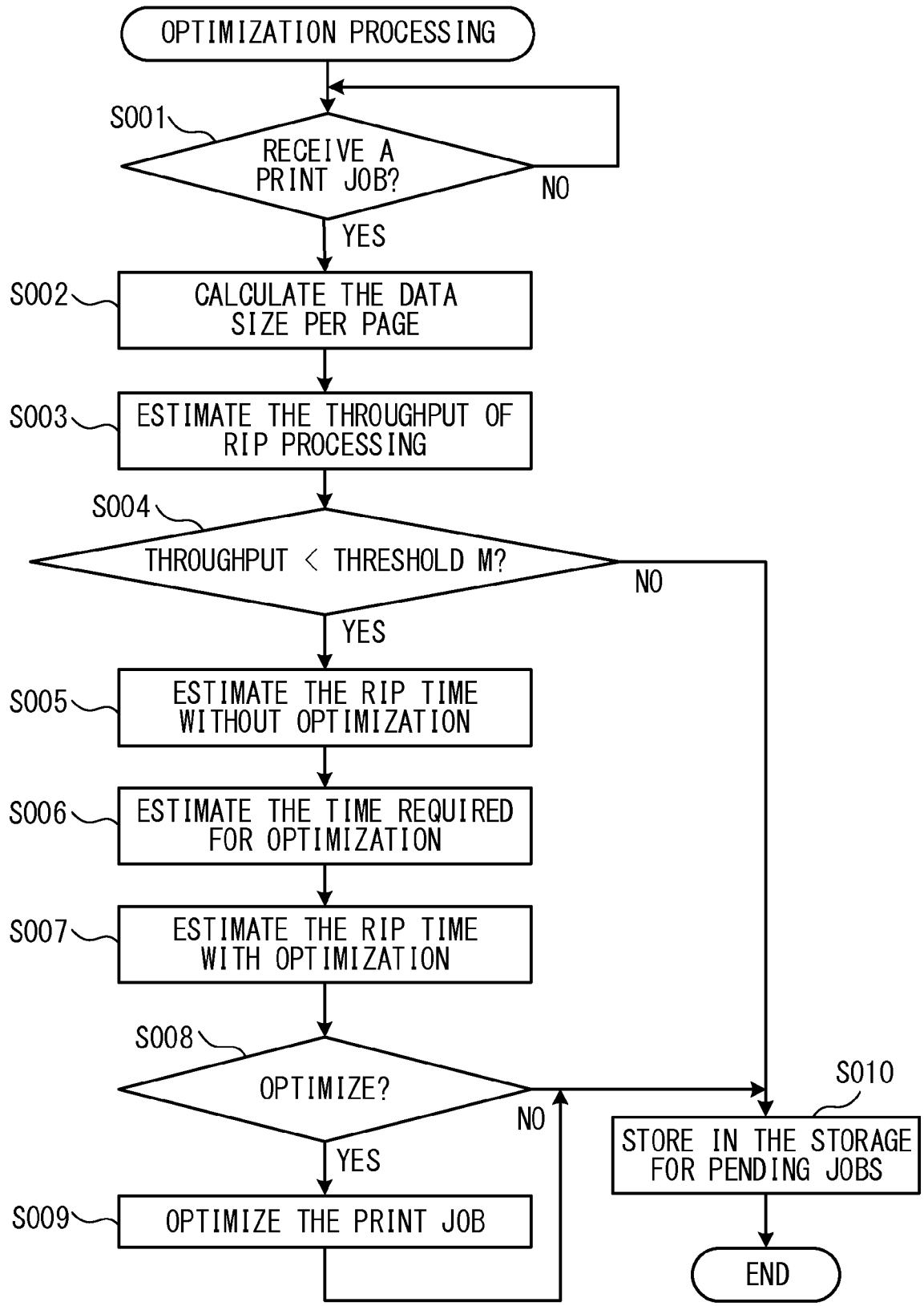
F I G. 5

ORDER OF PROCESSING WITHOUT OPTIMIZATION

| ORDER OF RECEIVING | ORDER OF PROCESSING | NAME OF PRINT JOB | DATA SIZE PER PAGE (byte) | ESTIMATED THROUGHPUT (ppm) |
|---|---|---|---|---|
| 1 | 1 | J1 | 30M | 25 |
| 2 | 2 | J2 | 4M | 100 |
| 3 | 3 | J3 | 20k | 300 |
| 4 | 4 | J4 | 20k | 300 |

F I G. 6 A

ORDER OF PROCESSING WITH OPTIMIZATION

| ORDER OF RECEIVING | ORDER OF PROCESSING | NAME OF PRINT JOB | DATA SIZE PER PAGE AFTER OPTIMIATION (byte) | ESTIMATED THROUGHPUT AFTER OPTIMIATION (ppm) |
|---|---|---|---|---|
| 3 | 1 | J3 | 20k | 300 |
| 4 | 2 | J4 | 20k | 300 |
| 2 | 3 | J2 | 400k | 200 |
| 1 | 4 | J1 | 2M | 150 |

F I G. 6 B

IMAGE PROCESSING DEVICE

CROSS-REFERENCE TO RELATED APPLICATION

This application is based upon and claims the benefit of priority of the prior Japanese Patent Application No. 2014-032857, filed on Feb. 24, 2014, the entire contents of which are incorporated herein by reference.

FIELD

The present invention relates to an image processing device.

BACKGROUND

Printing devices which permit receiving and printing data in the PDF (Portable Document Format) format (hereinafter referred to as "PDF data") have become available in recent years. For example, the time required for rasterizing (hereinafter referred to as "RIP (Raster Image Processor) processing") increases significantly in PDF data which has a large size per page, such as PDF data including a high-resolution image. In other words, the throughput of RIP processing becomes reduced as the data size per page becomes larger.

In PDF data with many pages such as business forms, for example, productivity is greatly reduced when throughput of RIP processing is less than throughput of a printer engine.

For example, there is provided in Patent Document 1 a method to solve this problem. The method described in Patent Document 1 is compressing of an image of a page to be processed when RIP processing of the page is not completed before starting of printing of the page so as to reduce the time required to RIP processing of the page.

Patent Document 1: Japanese Laid-open Patent Publication No. 2010-277466

SUMMARY

In accordance with a first aspect of the present invention, there is provided an image processing device including a processor which performs a process including determining whether or not a data size per page of a received print job is greater than a preset threshold; estimating, when it is determined that the data size is greater than the threshold, a first RIP time per page, which is the time required to RIP (Raster Image Processor) process when a resolution of an image of the print job is not optimized, an optimization time per page, which is the time required to optimize, and a second RIP time per page when the resolution of the image of the print job is optimized; and optimizing the resolution of the image of the print job on the basis of the first RIP time, the optimization time, and the second RIP time so that the rates of decreasing the resolution in each image after conversion are substantially the same.

In accordance with the first aspect of the present invention, the image processing device determines whether or not the data size per page of the received print job is greater than the threshold. When it is determined that the calculated data size is greater than the threshold, the image processing device estimates a first RIP time per page when the received print job is not optimized, an optimization time per page, and a second RIP time per page when the received print job is optimized, on the basis of the calculated data size. Then, the image processing device performs optimization on the basis of the first RIP time, the optimization time, and the second RIP time so that the rates of decreasing the resolution in each image included in the print job are substantially the same. This permits performing optimization when the throughput of RIP processing is less than the throughput of a printer engine so as to improve the throughput of RIP processing, which results in increasing productivity. Further, since switching whether or not to optimize is performed for each print job so as to perform optimization so that the rates of decreasing the resolution in each image are substantially the same, the same images in the same print job having different resolutions does not occur. Thus, a good appearance in a printed result can also be ensured.

In accordance with a second aspect of the present invention, in the image processing device according to the first aspect of the present invention, wherein the process further includes identifying from among the images of the received print job the same image as that of other print jobs already optimized when optimization is performed, wherein the optimizing optimizes the received print job so that a resolution of the identified image is substantially the same as that of the image of the other print jobs already optimized.

In accordance with the second aspect of the present invention, when optimizing the received print job, the image processing device identifies from among the images of the received print job the same image as that of the other print jobs already optimized and optimizes the received print job so that the resolution of the identified image is substantially the same as that of the image of the other print jobs already optimized. This permits preventing the occurrence of a state in which the same images have different resolutions in the print jobs that include the same images and are thus considered to be relevant to each other.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 represents a configurative example of a printing system according to Embodiment 1.

FIG. 2 is a functional block diagram which represents a configurative example of the printing device configuring the printing system according to Embodiment 1.

FIG. 5 is an example of a flowchart for explaining an optimization processing flow according to Embodiment 1.

FIG. 6A is a table which represents an order of processing without optimization in a specific example.

FIG. 6B is a table which represents an order of processing with optimization in a specific example.

DESCRIPTION OF EMBODIMENTS

Figure 3:
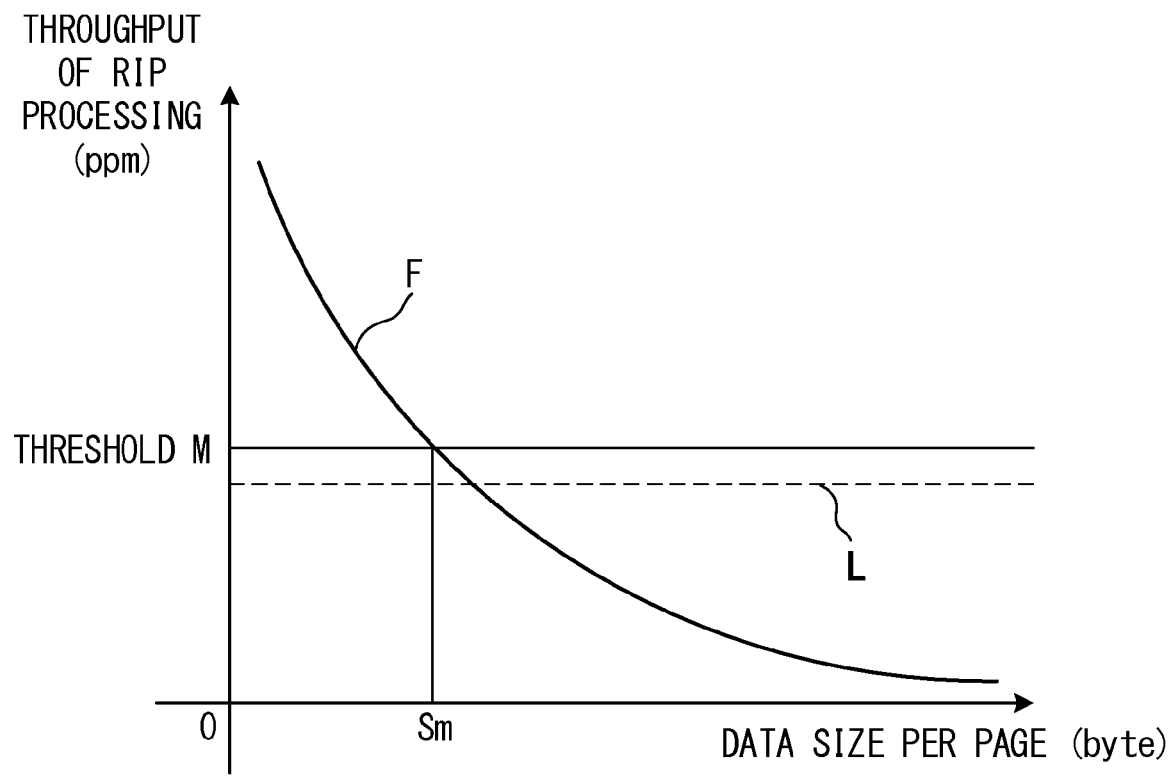
FIG. 3 is an example of a graph of a function F which describes a relationship between a data size per page and throughput of RIP processing.

Embodiments of the present invention will now be described in detail with reference to the drawings.

Embodiment 1 will now be described.

FIG. 1 represents a configurative example of a printing system 100 according to Embodiment 1. As represented in FIG. 1, the printing system 100 includes one or more information terminal devices 10 and one or more printing devices 20 as image processing devices, and the information terminal devices 10 and the printing devices 20 are communicably coupled to each other via a network NW.

In the embodiments including Embodiment 1 described below, a print job which is output from the information terminal device 10 and input into the printing device 20 is assumed to be PDF data.

FIG. 2 is a functional block diagram which represents a configurative example of the printing device 20 configuring the printing system 100. The printing device 20 processes PDF data which is output from the information terminal device 10 to output the data by printing it on a print medium such as paper, and includes a communication unit 21, a storage 22, a display unit 23, an operation unit 24, a printer 25, and a control unit 26, as represented in FIG. 2.

The communication unit 21 includes, for example, a communication module, and communicates with the information terminal device 10. For example, the communication unit 21 receives the PDF data output from the information terminal device 10.

The storage 22 includes, for example, RAM (Random Access Memory), ROM (Read Only Memory), and nonvolatile memory. The communication unit 22 functions as a work area of a CPU (Central Processing Unit) which forms the control unit 26, a program area to store various programs such as an operating program for controlling the entire printing device 20, and a data area to store various data such as a function F (described in detail later), a setting table T1 (described in detail later), and a threshold M (described in detail later).

The storage 22 also functions as a storage for pending jobs 22a as represented in FIG. 2. The storage for pending jobs 22a temporarily stores the PDF data to be RIP processed, and the PDF data are printed after being RIP processed by a RIP processing unit 26i (described in detail later) in the order of the timing at which the data are stored in the storage for pending jobs 22a.

Herein, referring to FIGS. 3 and 4, the function F and the setting table T1 which are stored in the data area of the storage 22 will now be described.

FIG. 3 is an example of a graph of the function F which describes a relationship between a data size per page (byte) and throughput of RIP processing (ppm (paper per minute)). The function F is obtained by measuring each throughput when a plurality of pieces of PDF data having different data sizes per page are RIP processed and using, for example, the method of least squares. As represented in FIG. 3, the function F describes the relationship between the data size per page and the throughput of RIP processing. This function F is used when a throughput estimating unit 26c (described in detail later) estimates the throughput of RIP processing in the PDF data which is received.

A dotted line L in the figure represents throughput of a printer engine (ppm), and the threshold M which serves as the standard to determine whether or not the PDF data is to be optimized is set to the same value as, or, as represented in FIG. 3, to a slightly larger value than, that of the throughput of a printer engine (ppm). The reason for setting the threshold M in this way is that optimization of PDF data is not required when the throughput of RIP processing exceeds the throughput of a printer engine since productivity is never reduced.

The relationship between the data size per page and the throughput of RIP processing may not be functionalized but may, for example, be held in table.

Figure 4:
FIG. 4 is an example of a setting table according to Embodiment 1.

FIG. 4 is an example of the setting table T1 according to Embodiment 1. The setting table T1 is obtained by measuring in advance the time required for optimization processing (hereinafter referred to as "optimization time") per page (s) and the data size per page after optimization (byte) when an optimization processing unit 26g (described in detail later) performs optimization processing on the plurality of pieces of PDF data having different data sizes per page, and putting them into a table. The setting table T1 is referred to when an optimization time estimating unit 26e (described in detail later) estimates the optimization time per page of the PDF data received. As represented in FIG. 4, the setting table T1 is a table in which the optimization time per page and the data size per page after optimization are associated for each data size per page.

The relationship between the data size per page and the optimization time per page, and the relationship between the data size per page and the data size per page after optimization may not be put into a table but instead be described by a function as in the relationship between the data size per page and the throughput of RIP processing, for example.

Referring again to FIG. 2, the display unit 23 includes display devices such as an LCD (Liquid Crystal Display) and an Organic EL (Electro-Luminescence) which display, for example, an image, various messages, or various functional buttons on a display screen.

The operation unit 24 is realized by, for example, a numeric keypad and a touch panel which is displayed on the display screen of the display unit 23, and a user can perform desired processing by operating the operation unit 24 and inputting instructions to the printing device 20.

The printer 25 includes, for example, a printer engine, and performs layout processing for each page when raster data are produced by the RIP processing unit 26i. Then, after performing image processing such as calibration on the page data which have been layout processed, the printer 25 outputs the data by printing the data on a print medium.

The control unit 26 includes, for example, a CPU, and executes the operating program which is stored in the program area of the storage 22 to realize its functions as a determination unit 26a, a data size calculating unit 26b, the throughput estimating unit 26c, a unit for estimating RIP time before optimization 26d, the optimization time estimating unit 26e, a unit for estimating RIP time after optimization 26f, the optimization processing unit 26g, a storing unit 26h, and the RIP processing unit 26i as represented in FIG. 2. Further, the control unit 26 executes the operating program to perform processing such as control processing which controls the entire printing device 20 and the optimization processing which will be described in detail later.

The determination unit 26a determines whether or not the PDF data has been received. The determination unit 26a also determines whether or not the value of the throughput of RIP processing which is estimated by the throughput estimating unit 26c is less than the threshold M which is preset and stored in the data area of the storage 22.

Further, the determination unit 26a determines whether or not the time required for RIP processing (hereinafter referred to as "RIP time") per page when optimization is not performed, which is estimated by the unit for estimating RIP time before optimization 26d, is greater than the total of the optimization time per page, which is estimated by the optimization time estimating unit 26e, and the RIP time per page when optimization is performed, which is estimated by the unit for estimating RIP time after optimization 26f, so as to determine whether or not optimization is to be performed.

In other words, the determination unit 26a determines that optimization is to be performed in the case of (RIP time per page when optimization is not performed)>[(optimization time per page)+(RIP time per page when optimization is performed)], while it determines that optimization is not to be performed in the case of (RIP time per page when optimization is not performed)≤[(optimization time per page)+(RIP time per page when optimization is performed)].

The data size calculating unit 26b calculates the data size per page of the received PDF data on the basis of the data size and the number of pages of the received PDF data.

The throughput estimating unit 26c estimates the throughput of RIP processing which corresponds to the data size per page calculated by the data size calculating unit 26b using the function F that is stored in the data area of the storage 22.

The unit for estimating RIP time before optimization 26d estimates the RIP time per page when the received PDF data is not optimized. More specifically, the unit for estimating RIP time before optimization 26d estimates the RIP time per page when the received PDF data is not optimized, on the basis of the data size per page calculated by the data size calculating unit 26b, using the relationship in which the RIP time is substantially proportional to the data size, or the function F.

Referring to the setting table T1, the optimization time estimating unit 26e estimates the optimization time per page on the basis of the data size per page calculated by the data size calculating unit 26b.

More specifically, when the setting table T1 includes a data size which has the same value as the data size per page calculated by the data size calculating unit 26b, the optimization time estimating unit 26e identifies the optimization time per page which corresponds to the data size to estimate the identified optimization time per page as the optimization time per page of the received PDF data.

When the setting table T1 does not include a data size which has the same value as the data size per page calculated by the data size calculating unit 26b, the optimization time estimating unit 26e estimates the optimization time per page using, for example, the linear interpolation method. For example, referring to FIG. 4, when the data size S per page calculated by the data size calculating unit 26b is described by S1<S<S2, the optimization time estimating unit 26e estimates the optimization time per page To(S) using Formula 1 below:

$$To(S) = \frac{S-S1}{S2-S1} \times To2 + \frac{S2-S}{S2-S1} \times To1 \quad \text{[Formula 1]}$$

Referring again to FIG. 2, the unit for estimating RIP time after optimization 26f estimates the RIP time per page when the received PDF data is optimized. More specifically, referring to the setting table T1, the unit for estimating RIP time after optimization 26f estimates the data size per page after optimization on the basis of the data size per page calculated by the data size calculating unit 26b. Then, the unit for estimating RIP time after optimization 26f estimates the RIP time per page when the received PDF data is optimized, on the basis of the estimated data size per page after optimization, using a relationship in which the RIP time is substantially proportional to the data size, or the function F.

For example, when the setting table T1 includes a data size which has the same value as the data size per page calculated by the data size calculating unit 26b, the unit for estimating RIP time after optimization 26f identifies the data size per page after optimization which corresponds to that data size. Then, the unit for estimating RIP time after optimization 26f estimates the identified data size per page after optimization as the data size per page after optimization in the received PDF data.

Further, for example, when the setting table T1 does not include a data size which has the same value as the data size per page calculated by the data size calculating unit 26b, the unit for estimating RIP time after optimization 26f estimates the data size per page after optimization using, for example, the linear interpolation method. For example, referring to FIG. 4, when the data size S per page calculated by the data size calculating unit 26b is described by S1<S<S2, the unit for estimating RIP time after optimization 26f estimates the data size per page after optimization So(S) using Formula 2 below:

$$So(S) = \frac{S-S1}{S2-S1} \times So2 + \frac{S2-S}{S2-S1} \times So1 \quad \text{[Formula 2]}$$

Referring again to FIG. 2, the optimization processing unit 26g optimizes a resolution in each image included in the received PDF data and decreases the data sizes per page so as to improve the throughput of RIP processing after optimization. In this case, the optimization processing unit 26g performs optimization so that the rates of decreasing the resolution in each image are the same. Using existing software such as Acrobat® from Adobe Systems or existing technologies permits optimizing of the PDF data.

The storing unit 26h stores the PDF data in the storage for pending jobs 22a.

The RIP processing unit 26i acquires the PDF data from the storage for pending jobs 22a in the order of the timing at which the data are stored by the storing unit 26h in the storage for pending jobs 22a, RIP processes the acquired PDF data, and produces raster data.

Next, referring to FIG. 5, the optimization processing according to Embodiment 1 will now be described. FIG. 5 is an example of a flowchart for explaining an optimization processing flow according to Embodiment 1. The optimization processing starts by receiving PDF data (a print job) output by the information terminal device 10 as a trigger. A plurality of optimization processing may be performed in parallel.

The determination unit 26a determines whether or not the PDF data has been received (Step S001). When the determination unit 26a determines that the PDF data has not been received (Step S001; NO), the process repeats Step S001 until the PDF data is received.

On the other hand, when the determination unit 26a determines that the PDF data has been received (Step S001; YES), the data size calculating unit 26b calculates the data size per page of the received PDF data (Step S002).

The throughput estimating unit 26c estimates the throughput of RIP processing which corresponds to the data size per page calculated by the data size calculating unit 26b using the function F (Step S003).

The determination unit 26a determines whether or not the value of the throughput of RIP processing which is estimated by the throughput estimating unit 26c is less than the threshold M (Step S004). When the determination unit 26a determines that the value of the estimated throughput of RIP processing is greater than or equal to the threshold M (Step S004; NO), the process proceeds to Step S010. Then, the storing unit 26h stores the received PDF data in the storage for pending jobs 22a without optimizing the data (Step S010), and the process ends.

On the other hand, when the determination unit 26a determines that the value of the estimated throughput of RIP processing is less than the threshold M (Step S004; YES), the unit for estimating RIP time before optimization 26d estimates the RIP time per page when the received PDF data is not optimized on the basis of the data size per page calculated by the data size calculating unit 26b (Step S005).

Referring to the setting table T1, the optimization time estimating unit 26e estimates the optimization time per page on the basis of the data size per page calculated by the data size calculating unit 26b (Step S006).

Referring to the setting table T1, the unit for estimating RIP time after optimization 26f estimates the data size per page after optimization on the basis of the data size per page calculated by the data size calculating unit 26b and estimates the RIP time per page when the received PDF data is optimized, on the basis of the estimated data size per page after optimization (Step S007).

The determination unit 26a determines whether or not the received PDF data is to be optimized on the basis of the estimated RIP time per page when optimization is not performed, the estimated optimization time per page, and the estimated RIP time per page when optimization is performed (Step S008). When the determination unit 26a determines that the received PDF data is not to be optimized (Step 008; NO), the process proceeds to Step S010. Then, the storing unit 26h stores the received PDF data in the storage for pending jobs 22a without optimizing the data (Step S010), and the process ends.

On the other hand, when the determination unit 26a determines that the received PDF is to be optimized (Step S008; YES), the optimization processing unit 26g optimizes the received PDF data (Step S009). Then, the storing unit 26h stores the optimized PDF data in the storage for pending jobs 22a (Step S010), and the process ends.

Next, referring to FIG. 6, orders of RIP processing when the optimization processing is not performed and when the optimization processing is performed will now be described according to specific examples. FIG. 6A is a table which represents the order of processing without optimization in the specific example, and FIG. 6B is a table which represents the order of processing with optimization in the specific example.

For example, it is assumed that the print jobs are received in an order of J1, J2, J3, and J4, the data sizes per page are 30 M byte, 4 M byte, 20 k byte, and 20 k byte, respectively, and the values of the estimated throughput of RIP processing in this case are 25 ppm, 100 ppm, 300 ppm, and 300 ppm, respectively, as represented in FIG. 6A.

For example, if the throughput of a printer engine is 130 ppm, productivity is reduced when processing the print jobs J1 and J2 whose value of the estimated throughput of RIP processing is less than 130 ppm, but the print jobs are RIP processed in the order in which they were received and then printed when the optimization processing is not performed, as represented in FIG. 6A.

On the other hand, when the optimization processing is performed with the threshold M=140, the process of and after Step S005 is performed on the print jobs J1 and J2 whose value of the estimated throughput of RIP processing is less than 140. In this specific example, it is assumed that all the print jobs are optimized by the optimization processing unit 26g, and the jobs are stored in the storage for pending jobs 22a in an order of J3, J4, J2, and J1. In this case, the RIP processing unit 26i acquires the print jobs in the order of the timing at which the jobs are stored in the storage for pending jobs 22a so as to RIP process the acquired print jobs. Thus, the RIP processing unit 26i RIP processes in the order of J3, J4, J2, and J1, as represented in FIG. 6B.

Further, as represented in FIGS. 6A and 6B, the data sizes per page of the print jobs J1 and J2 after optimization are less than the data size per page before optimization, which permits improving the throughput of RIP processing.

According to the above Embodiment 1, the printing device 20 calculates the data size per page of the received PDF data, estimates the throughput of RIP processing on the basis of the calculated data size, and determines whether or not the value of the estimated throughput of RIP processing is less than the threshold M. When it is determined that the value of the estimated throughput of RIP processing is less than the threshold M, the printing device 20 estimates the RIP time per page when the received PDF data is not optimized, the optimization time per page, and the RIP time per page when the received PDF data is optimized, on the basis of the calculated data size. Then, the printing device 20 determines whether or not the received PDF data is to be optimized, on the basis of the estimated RIP time when optimization is not performed, the estimated optimization time, and the estimated RIP time when optimization is performed. When it is determined that optimization is to be performed, the printing device 20 performs optimization so that the rates of decreasing the resolution in each image included in the received PDF data are the same.

This permits performing optimization when the throughput of RIP processing is less than the throughput of a printer engine so as to improve the throughput of RIP, which results in increasing productivity. Further, since switching whether or not to optimize is performed for each print job so as to perform optimization so that the rates of decreasing the resolution in each image are the same, the same images in the same print job having different resolutions does not occur. Thus, a good appearance in a printed result can also be ensured.

Embodiment 2 will now be described.

In Embodiment 2, when images of the PDF data that is stored in the storage for pending jobs 22a (hereinafter referred to as "stored PDF data") whose resolution has been converted is included in the images of the PDF data to be processed, the resolution of such the images is converted so as to be adjusted to the resolution of the same image in the stored PDF data as that of the PDF data to be processed.

Figure 7:
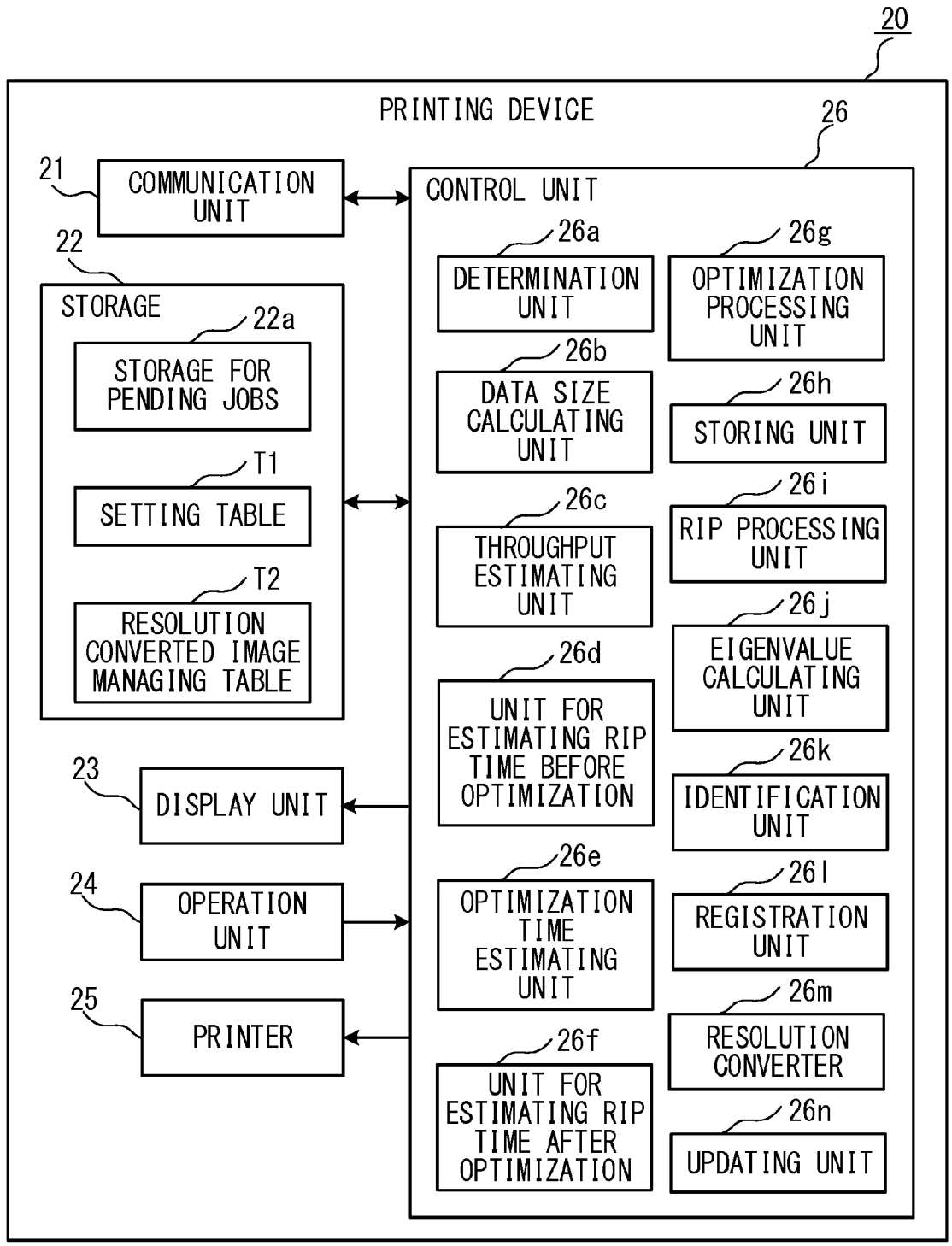
FIG. 7 is a functional block diagram which represents a configurative example of a printing device configuring a printing system according to Embodiment 2.

FIG. 7 is a functional block diagram which represents a configurative example of the printing device 20 configuring the printing system 100 according to Embodiment 2. The printing system 20 according to Embodiment 2 has the same basic configuration as in Embodiment 1. However, as represented in FIG. 7, the configuration of the control unit 26 is different. In addition, a resolution converted image managing table T2 is further stored in the data area of the storage 22 as illustrated in FIG. 8.

Herein, referring to FIG. 8, the resolution converted image managing table T2 will now be described. FIG. 8 is an example of the resolution converted image managing table T2 according to Embodiment 2. The resolution converted image managing table T2 according to Embodiment 2 manages the images whose resolution has been converted as a result of optimization, and is referred to, for example, when a resolution converter 26*m* (described in detail later) determines a resolution corresponding to an eigenvalue identified by an identification unit 26*k* (described in detail later).

Figure 8:
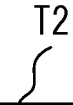
FIG. 8 is an example of a resolution converted image managing table according to Embodiment 2.

As represented in FIG. 8, the resolution converted image managing table T2 according to Embodiment 2 is a table in which the eigenvalue and the resolution are associated. The eigenvalue is an eigenvalue of an image whose resolution has been converted, and the resolution is a resolution after conversion. For example, if the resolution of the image with an eigenvalue UN1 is converted by optimization from 200 dpi to 120 dpi, the eigenvalue UN1 and the resolution after conversion 120 dpi are associated and stored in the resolution converted image managing table T2.

Referring again to FIG. 7, the control unit 26 in the printing system 20 according to Embodiment 2 includes, for example, a CPU, and executes the operating program which is stored in the program area of the storage 22 so as to realize its functions as the determination unit 26*a*, the data size calculating unit 26*b*, the throughput estimating unit 26*c*, the unit for estimating RIP time before optimization 26*d*, the optimization time estimating unit 26*e*, the unit for estimating RIP time after optimization 26*f*, the optimization processing unit 26*g*, the storing unit 26*h*, the RIP processing unit 26*i*, an eigenvalue calculating unit 26*j*, the identification unit 26*k*, a registration unit 26*l*, the resolution converter 26*m*, and an updating unit 26*n*, as represented in FIG. 7. Further, the control unit 26 executes the operating program to perform processing such as the control processing which controls the entire printing device 20 and the optimization processing.

The eigenvalue calculating unit 26*j*, the identification unit 26*k*, the registration unit 26*l*, the resolution converter 26*m*, and the updating unit 26*n*, which are a functional unit specific to Embodiment 2, as well as the functional units (determination unit 26*a* and optimization processing unit 26*g*) that have a different function from those of Embodiment 1, will now be described.

The determination 26*a* further determines whether or not an eigenvalue has been identified by the identification unit 26*k*.

For the images that are among the images of the PDF data to be processed whose eigenvalue has been identified by the identification unit 26*k* when the eigenvalue is identified by the identification unit 26*k*, the optimization processing unit 26*g* optimizes the PDF data to be processed so that the resolution after conversion is the same as the resolution of the corresponding image of the stored PDF data. In this case, referring to the resolution converted image managing table T2, the optimization processing unit 26*g* identifies the resolution corresponding to the eigenvalue identified by the identification unit 26*k* so as to identify the resolution of the corresponding image of the stored PDF data.

The eigenvalue calculating unit 26*j* calculates an eigenvalue which enables unique identification of an image for each of the images of the PDF data to be processed and adds the calculated eigenvalues to the corresponding image respectively. In this way, adding an eigenvalue to an image and determining whether or not the eigenvalues are the same permits determining whether or not the images are the same. In this case, the eigenvalue may be a hash value or a CRC (Cyclic Redundancy Check) value, for example.

The identification unit 26*k* identifies from among the images of the PDF data to be processed the same image as the image of the stored PDF data whose resolution has been converted.

More specifically, the identification unit 26*k* determines whether or not the same eigenvalue as that of the image of the PDF data to be processed is registered in the resolution converted image managing table T2. When the same eigenvalue as that of the image of the PDF data to be processed is registered in the resolution converted image managing table T2, the identification unit 26*k* further identifies the same eigenvalue as that of the image of the stored PDF data from among the same eigenvalues as those of the images of the PDF data to be processed that are registered in the resolution converted image managing table T2.

For example, referring to the resolution converted image managing table T2 illustrated in FIG. 8, it is assumed that the same eigenvalues as those of the images of the PDF data to be processed are UN1, UN3, and UN11. Further, if the image having UN1 and the image having UN11 as an eigenvalue are included in the images of the stored PDF data, the identification unit 26*k* then identifies the eigenvalues UN1 and UN11.

Referring again to FIG. 7, the registration unit 26*l* extracts the images whose resolution has been converted when the PDF data is optimized by the optimization processing unit 26*g*. Then, the registration unit 26*l*, among the extracted images, associates the eigenvalues and resolutions after conversion of the images whose eigenvalue is not registered in the resolution converted image managing table T2, and registers them respectively in the resolution converted image managing table T2.

When the determination 26*a* determines that the throughput of RIP processing is greater than or equal to the threshold M or that optimization is not to be performed, that is, when the PDF data to be processed is not optimized, then, among the images of the PDF data to be processed, the resolution converter 26*m* converts the resolution of the image of the eigenvalue identified by the identification unit 26*k* so as to adjust to the resolution of the corresponding image of the stored PDF data.

More specifically, referring to the resolution converted image managing table T2, the resolution converter 26*m* identifies the resolution corresponding to the eigenvalue identified by the identification unit 26*k* and converts the resolution of the corresponding image of the PDF data to be processed so as to adjust to the identified resolution. In this way, even if the same images are used between the print jobs which are highly relevant to each other, it is possible to prevent the problem wherein the same images have different resolutions and thereby ensure a good appearance in a printed result even between different print jobs.

The updating unit 26*n* updates the resolution converted image managing table T2. More specifically, for the images among the images extracted by the registration unit 26*l* whose eigenvalue is registered in the resolution converted image managing table T2, the updating unit 26*n* updates the resolution in the resolution converted image managing table T2.

Figure 9:
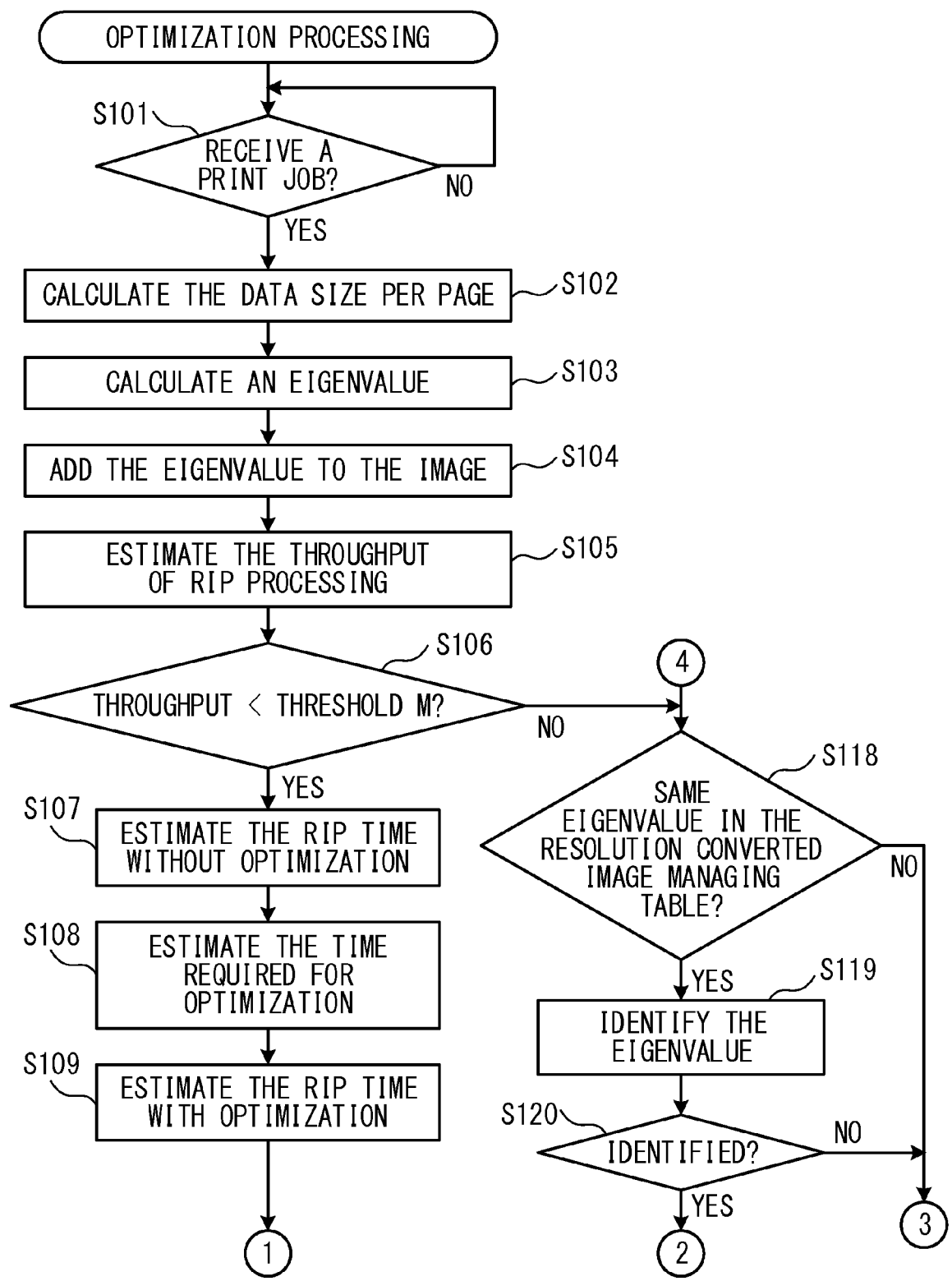
FIG. 9 is one part of an example of a flowchart for explaining an optimization processing flow according to Embodiment 2.
Figure 10:
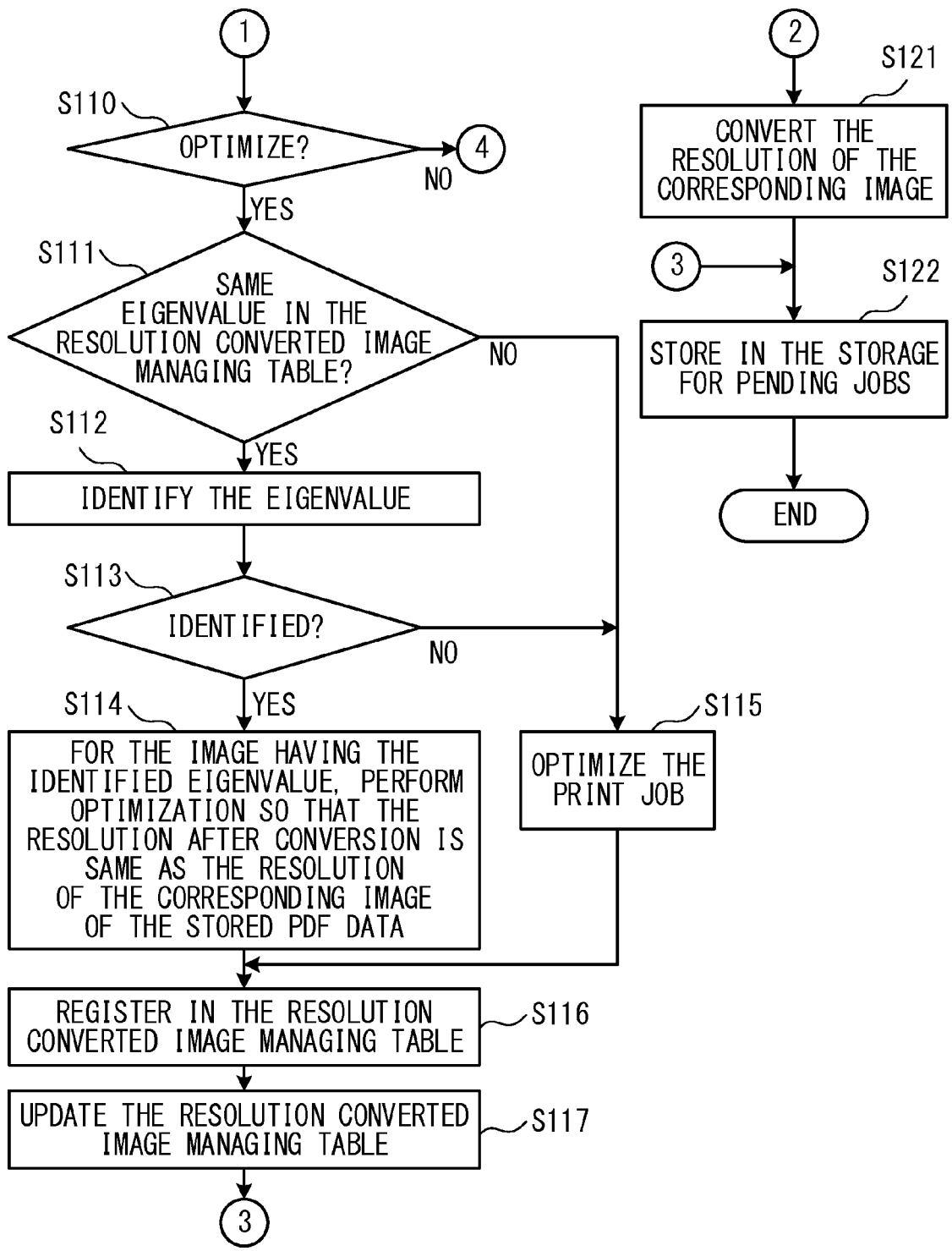
FIG. 10 is another part of the example of the flowchart for explaining the optimization processing flow according to Embodiment 2.

Next, referring to FIGS. 9 and 10, the optimization processing according to Embodiment 2 will now be described. FIGS. 9 and 10 are one part and another part of an example of a flowchart for explaining an optimization processing flow according to Embodiment 2. The optimization processing starts by receiving PDF data (a print job) output by the information terminal device 10 as a trigger. A plurality of cases of optimization processing may be performed in parallel.

The determination unit 26*a* determines whether or not the PDF data has been received (Step S101). When the determination unit 26*a* determines that the PDF data has not been received (Step S101; NO), the process repeats Step S101 until the PDF data is received.

On the other hand, when the determination unit 26*a* determines that the PDF data has been received (Step S101; YES), the data size calculating unit 26*b* calculates the data size per page of the received PDF data (Step S102).

The eigenvalue calculating unit 26*j* calculates an eigenvalue which enables unique identification of an image (Step S103) and adds the calculated eigenvalues to the corresponding image respectively (Step S104). Then, the throughput estimating unit 26*c* estimates the throughput of RIP processing which corresponds to the data size per page calculated by the data size calculating unit 26*b* using the function F (Step S105).

The determination unit 26*a* determines whether or not the value of the throughput of RIP processing which is estimated by the throughput estimating unit 26*c* is less than the threshold M (Step S106). When the determination unit 26*a* determines that the value of the estimated throughput of RIP processing is greater than or equal to the threshold M (Step S106; NO), the process proceeds to Step S118 which will be described later.

On the other hand, when the determination unit 26*a* determines that the value of the estimated throughput of RIP processing is less than the threshold M (Step S106; YES), the unit for estimating RIP time before optimization 26*d* estimates the RIP time per page when the received PDF data is not optimized on the basis of the data size per page calculated by the data size calculating unit 26*b* (Step S107).

Referring to the setting table T1, the optimization time estimating unit 26*e* estimates the optimization time per page on the basis of the data size per page calculated by the data size calculating unit 26*b* (Step S108).

Referring to the setting table T1, the unit for estimating RIP time after optimization 26*f* estimates the data size per page after optimization on the basis of the data size per page calculated by the data size calculating unit 26*b* and estimates the RIP time per page when the received PDF data is optimized, on the basis of the estimated data size per page after optimization (Step S109).

The determination unit 26*a* determines whether or not the received PDF data is to be optimized, on the basis of the estimated RIP time per page when optimization is not performed, the estimated optimization time per page, and the estimated RIP time per page when optimization is performed (Step S110). When the determination unit 26*a* determines that the received PDF data is not to be optimized (Step S110; NO), the process proceeds to Step S118 which will be described later.

On the other hand, when the determination unit 26*a* determines that the received PDF is to be optimized (Step S110; YES), the identification unit 26*k* determines whether or not the same eigenvalue as that of the image of the received PDF data is registered in the resolution converted image managing table T2 (Step S111). When the identification unit 26*k* determines that the same eigenvalue as that of the image of the received PDF data is not registered in the resolution converted image managing table T2 (Step S111; NO), the process proceeds to Step S115 which will be described later.

On the other hand, when it is determined that the same eigenvalue as that of the image of the received PDF data is registered in the resolution converted image managing table T2 (Step S111; YES), the identification unit 26*k* further identifies the same eigenvalue as that of the image of the stored PDF data from among the same eigenvalues as those of the images of the received PDF data that are registered in the resolution converted image managing table T2 (Step S112).

The determination unit 26*a* determines whether or not the eigenvalue has been identified by the identification unit 26*k* (Step S113). When the determination unit 26*a* determines that the eigenvalue has been identified (Step S113; YES), the optimization processing unit 26*g* optimizes the received PDF data so that for the images that are among the images of the received PDF data whose eigenvalue has been identified by the identification unit 26*k*, the resolution after conversion is the same as the resolution of the corresponding image of the stored PDF data (Step S114). Then, the process proceeds to Step S116 which will be described later.

On the other hand, when the determination 26*a* determines that the eigenvalue has not been identified (Step S113; NO), the optimization processing unit 26*g* optimizes the received PDF data (Step S115). Then, the registration unit 26*l* extracts the images whose resolution has been converted upon optimization, and among the extracted images, associates the eigenvalues and resolutions after conversion of the images whose eigenvalue is not registered in the resolution converted image managing table T2, and registers them respectively in the resolution converted image managing table T2 (Step S116).

For the images among the images extracted by the registration unit 26*l* whose eigenvalue is registered in the resolution converted image managing table T2, the updating unit 26*n* updates the resolution in the resolution converted image managing table T2 (Step S117). Then, the process proceeds to Step S122 which will be described later.

In the processing of Step S106, when the determination unit 26*a* determines that the value of the estimated throughput of RIP processing is greater than or equal to the threshold M (Step S106; NO), the identification unit 26*k* determines whether or not the same eigenvalue as that of the image of the received PDF data is registered in the resolution converted image managing table T2 (Step S118). When the identification unit 26*k* determines that the same eigenvalue as that of the image of the received PDF data is not registered in the resolution converted image managing table T2 (Step S118; NO), the process proceeds to Step S122 which will be described later.

On the other hand, when it is determined that the same eigenvalue as that of the image of the received PDF data is registered in the resolution converted image managing table T2 (Step S118; YES), the identification unit 26*k* further identifies the same eigenvalue as that of the image of the stored PDF data from among the same eigenvalues as those of the images of the received PDF data that are registered in the resolution converted image managing table T2.

The determination 26*a* determines whether or not the eigenvalue has been identified by the identification unit 26*k* (Step S120). When the determination 26*a* determines that the eigenvalue has not been identified (Step S120; NO), the process proceeds to Step S122 which will be described later.

On the other hand, when the determination 26*a* determines that the eigenvalue has been identified (Step S120; YES), among the images of the received PDF data, the resolution converter 26*m* converts the resolution of the image of the eigenvalue identified by the identification unit 26k so as to adjust to the resolution of the corresponding image of the stored PDF data (Step S121).

Then, the storing unit 26h stores the PDF data to be processed in the storage for pending jobs 22a (Step S122), and the process ends.

According to the above Embodiment 2, the printing device 20 includes the storage for pending jobs 22a, and identifies from among the images of the received PDF data the same image as the image of the PDF data that is stored in the storage for pending jobs 22a (stored PDF data) whose resolution has been converted when the received PDF data is optimized. For the identified image, the printing device 20 optimizes the received PDF data so that the resolution after conversion is the same as the resolution of the corresponding image of the stored PDF data. This permits preventing the occurrence of a state in which the same images have different resolutions in the PDF data which are received almost at the same time and are thus considered to be relevant to each other.

Further, according to the above Embodiment 2, when optimization is not performed, the printing device 20 identifies from among the image of the received PDF data the same image as the image of the stored PDF data whose resolution has been converted, and for the identified image, it converts the resolution of the image of the received PDF data so that the resolution after conversion is the same as the resolution of the corresponding image of the stored PDF data. This further permits preventing the occurrence of a state in which the same images have different resolutions in the PDF data which are received almost at the same time and are thus considered to be relevant to each other.

Embodiment 3 will now be described.

In the above Embodiment 2, when the same image as the image of the stored PDF data whose resolution has been converted is included in the images of the PDF data to be processed, the resolution of such the images is converted so as to be adjusted to the resolution of the same image as in the PDF data to be processed in the stored PDF data.

In Embodiment 3, not limited to the stored PDF data, when the same image as the image whose resolution was converted during a most recent predetermined time period is included in the images of the PDF data to be processed, the resolution of such the images is converted so as to be adjusted to the resolution of the image whose resolution has been converted.

Figure 11:
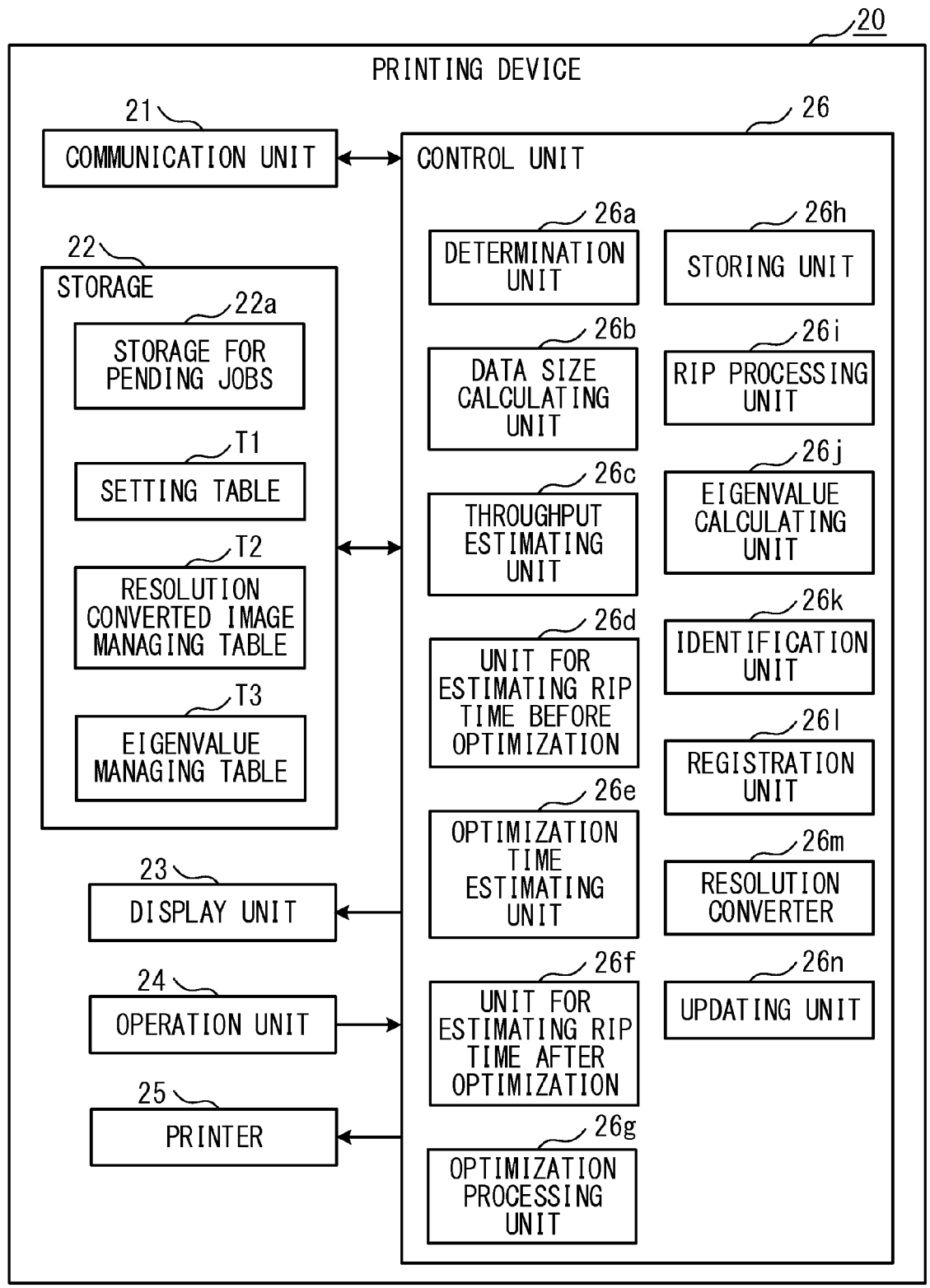
FIG. 11 is a functional block diagram which represents a configurative example of a printing device configuring a printing system according to Embodiment 3.
Figure 12:
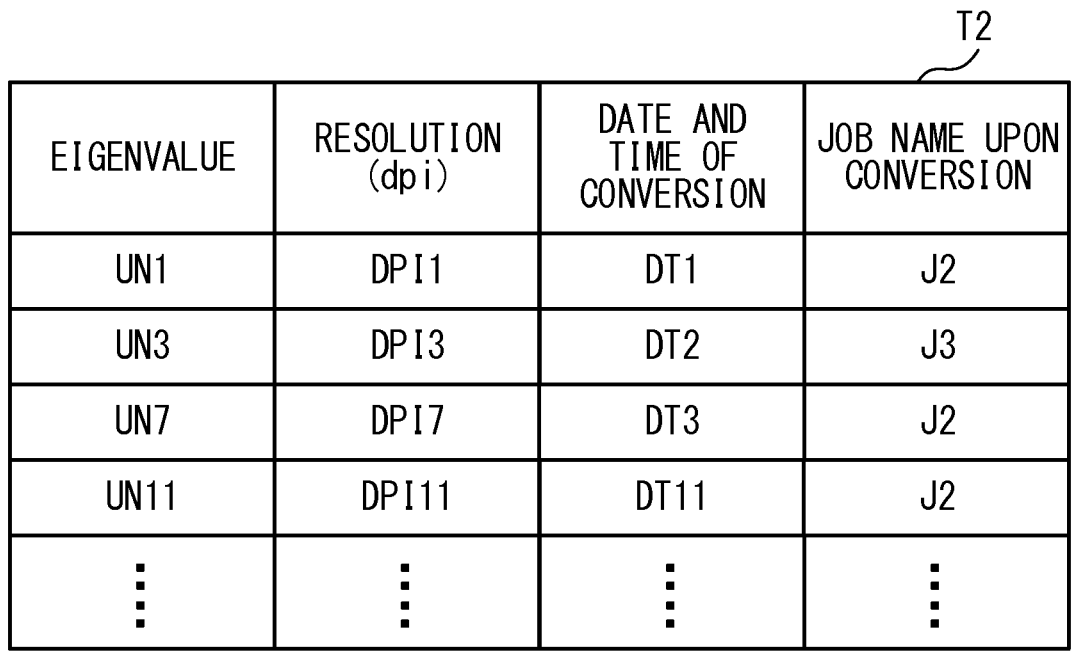
FIG. 12 is an example of a resolution converted image managing table according to Embodiment 3.

FIG. 11 is a functional block diagram which represents a configurative example of the printing device 20 configuring the printing system 100 according to Embodiment 3. The printing system 20 according to Embodiment 3 has the same basic configuration as in Embodiment 2. However, as represented in FIG. 12, the configuration of the resolution converted image managing table T2 is different. In addition, as represented in FIG. 11, an eigenvalue managing table T3 as illustrated in FIG. 13 is further stored in the data area of the storage 22.

Figure 13:
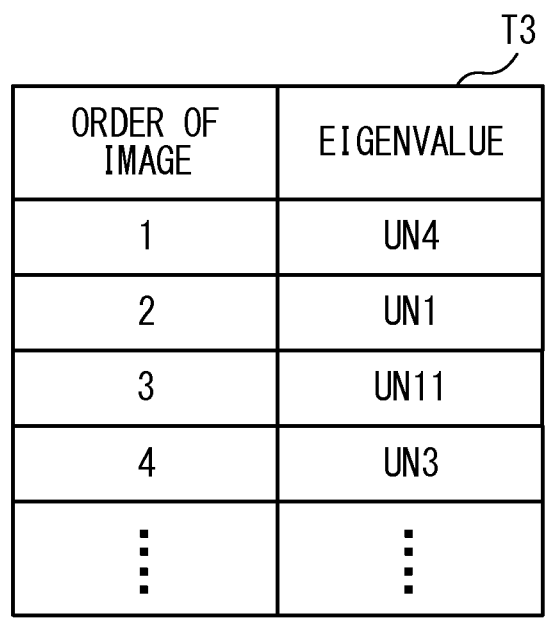
FIG. 13 is an example of an eigenvalue managing table according to Embodiment 3.

Herein, referring to FIGS. 12 and 13, the resolution converted image managing table T2 and the eigenvalue managing table T3 will now be respectively described. FIG. 12 is an example of the resolution converted image managing table T2 according to Embodiment 3. FIG. 13 is an example of the eigenvalue managing table T3 according to Embodiment 3.

The resolution converted image managing table T2 according to Embodiment 3 manages the images whose resolution has been converted as a result of optimization, and is referred to, for example, when the identification unit 26k identifies from among the images of the PDF data to be processed the image whose resolution was converted during the most recent predetermined time period.

As represented in FIG. 12, the resolution converted image managing table T2 according to Embodiment 3 is a table in which the resolution, a date and time of conversion, and a job name upon conversion are associated respectively for each eigenvalue.

The date and time of conversion is a date and time when a resolution was converted to the corresponding resolution. The job name upon conversion is a name of a print job to be processed when the resolution of the image with a corresponding eigenvalue is converted to the corresponding resolution, for example, a file name of the print job.

The eigenvalue managing table T3 according to Embodiment 3 is a table for managing the eigenvalues of the images in the PDF data to be processed, and is managed by the eigenvalue calculating unit 26j. The eigenvalue managing table T3 is referred to, for example, when the identification unit 26k determines whether or not the same eigenvalue as that of the image of the PDF data to be processed is included in the resolution converted image managing table T2. As represented in FIG. 13, the eigenvalue managing table T3 is a table in which an image order and the eigenvalue are associated. In addition, the eigenvalue managing table T3 is generated for each print job.

The image order is an order of arranging the images in the PDF data to be processed, for example. The eigenvalue is an eigenvalue in the image of the corresponding image order.

Referring again to FIG. 11, the control unit 26 in the printing system 20 according to Embodiment 3 includes, for example, a CPU, and executes the operating program which is stored in the program area of the storage 22 to realize its functions as the determination unit 26a, the data size calculating unit 26b, the throughput estimating unit 26c, the unit for estimating RIP time before optimization 26d, the optimization time estimating unit 26e, the unit for estimating RIP time after optimization 26f, the optimization processing unit 26g, the storing unit 26h, the RIP processing unit 26i, the eigenvalue calculating unit 26j, the identification unit 26k, the registration unit 26l, the resolution converter 26m, and the updating unit 26n, as represented in FIG. 11. Further, the control unit 26 executes the operating program to perform processing such as the control processing which controls the entire printing device 20 and the optimization processing.

The functional units (optimization processing unit 26g, eigenvalue calculating unit 26j, identification unit 26k, registration unit 26l, resolution converter 26m, and updating unit 26n) that have a different function from those of Embodiment 1 or 2 will now be described.

For the images that are among the images of the PDF data to be processed whose eigenvalue has been identified by the identification unit 26k when the eigenvalue is identified by the identification unit 26k, the optimization processing unit 26g optimizes the PDF data to be processed so that the resolution after conversion is the same as the corresponding resolution which is registered in the resolution converted image managing table T2.

The eigenvalue calculating unit 26j calculates an eigenvalue which enables unique identification of an image for each of the images of the PDF data to be processed, associates the image order and the calculated eigenvalue, and stores them in the eigenvalue managing table T3.

The identification unit 26k identifies from among the images of the PDF data to be processed the same image as the image whose resolution was converted during the most recent predetermined time period.

More specifically, the identification unit 26k determines whether or not the same eigenvalue as that of the image of the PDF data to be processed is registered in the resolution converted image managing table T2. When the same eigenvalue as that of the image of the PDF data to be processed is registered in the resolution converted image managing table T2, the identification unit 26k further identifies, from among the same eigenvalues as those of the images of the PDF data to be processed that are registered in the resolution converted image managing table T2, the eigenvalue of the image whose resolution was converted during the most recent predetermined time period.

For example, referring to the resolution converted image managing table T2 illustrated in FIG. 12, it is assumed that the same eigenvalues as those of the images of the PDF data to be processed are UN1, UN3, and UN11. Further, it is also assumed that the date and time of conversion among those for UN1, UN3, and UN11, which is included in the most recent predetermined time period, is DT11. The identification unit 26k then identifies the eigenvalue UN11.

Referring again to FIG. 11, the registration unit 26l extracts the images whose resolution has been converted when the PDF data is optimized by the optimization processing unit 26g. Then, among the extracted images, the registration unit 26l associates the eigenvalues, resolutions after conversion, date and time of conversion, and job name upon conversion of the images whose eigenvalue is not registered in the resolution converted image managing table T2, and registers them respectively in the resolution converted image managing table T2.

When the determination 26a determines that the throughput of RIP processing is greater than or equal to the threshold M or that optimization is not to be performed, that is, when the PDF data to be processed is not optimized, then, among the images of the PDF data to be processed, the resolution converter 26m converts the resolution of the image of the eigenvalue identified by the identification unit 26k so as to adjust to the corresponding resolution which is registered in the resolution converted image managing table T2.

More specifically, referring to the resolution converted image managing table T2, the resolution converter 26m identifies the resolution corresponding to the eigenvalue identified by the identification unit 26k and converts the resolution of the corresponding image of the PDF data to be processed so as to adjust to the identified resolution.

The updating unit 26n updates the resolution converted image managing table T2. More specifically, for the images among the images extracted by the registration unit 26l whose eigenvalue is registered in the resolution converted image managing table T2, the updating unit 26n updates the resolution, the date and time of conversion, and the job name upon conversion in the resolution converted image managing table T2.

Further, for the images whose resolution has been converted by the resolution converter 26m, the updating unit 26n updates the date and time of conversion and the job name upon conversion in the resolution converted image managing table T2.

Figure 14:
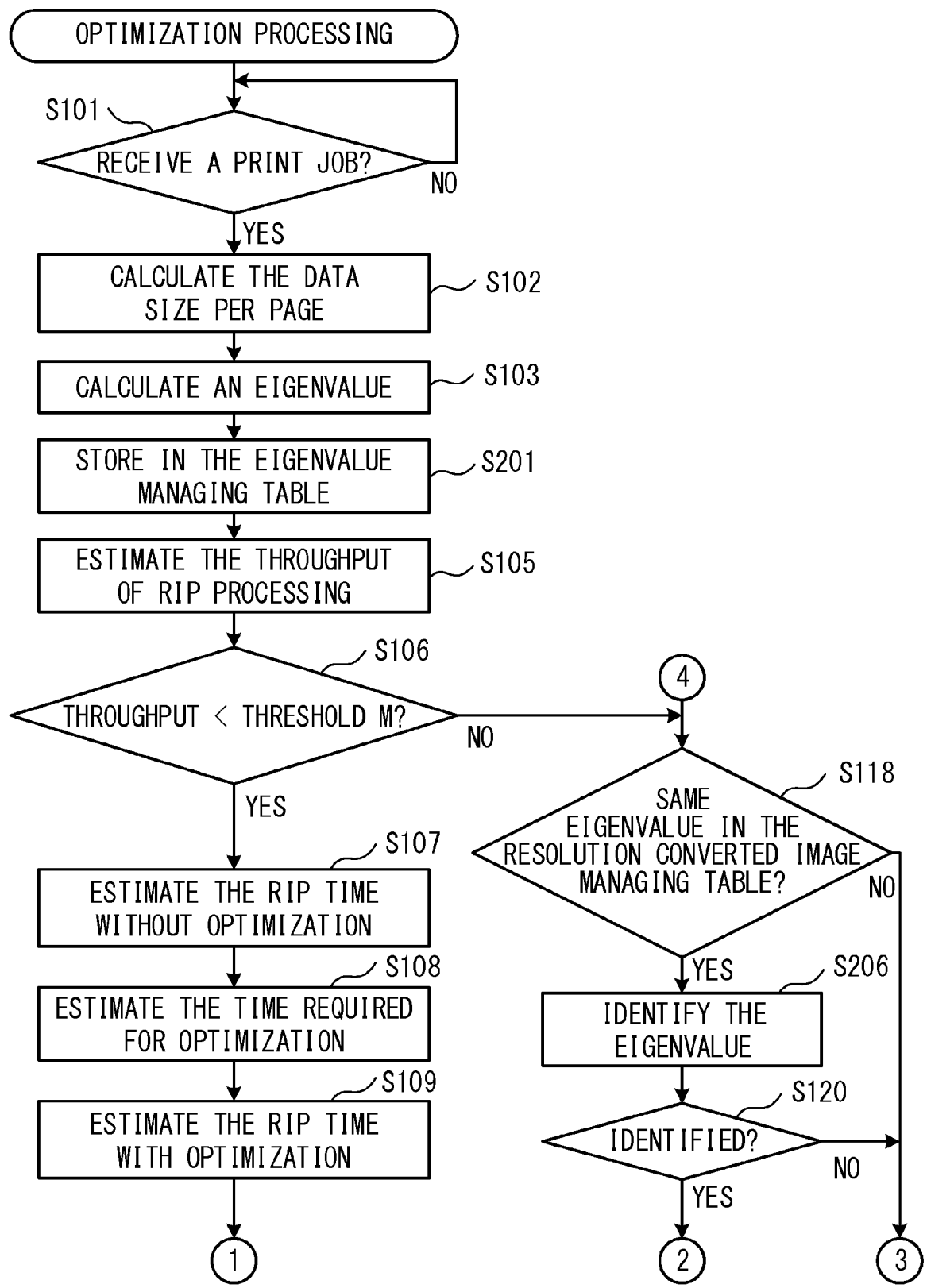
FIG. 14 is one part of an example of a flowchart for explaining an optimization processing flow according to Embodiment 3.
Figure 15:
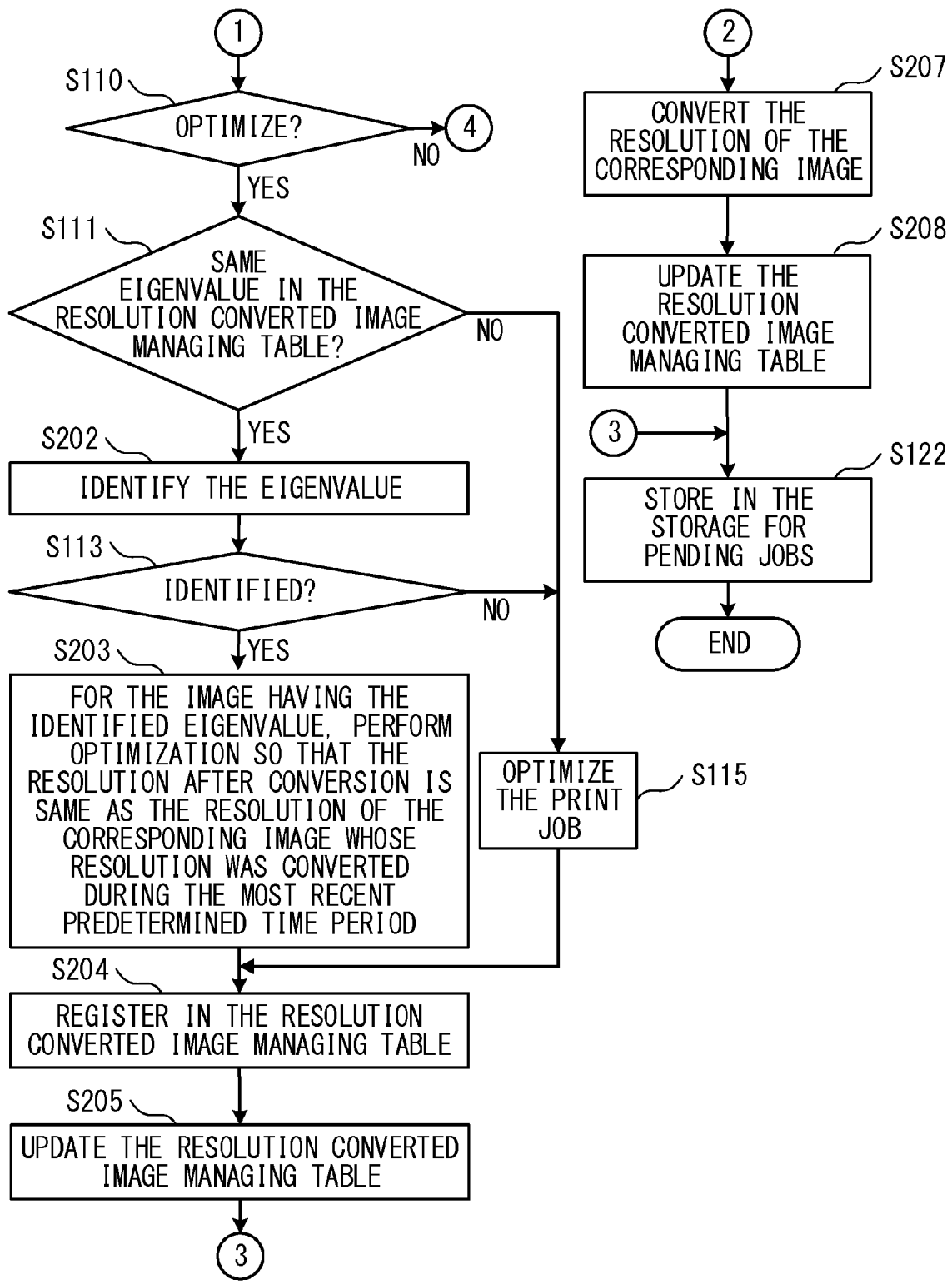
FIG. 15 is another part of the example of the flowchart for explaining the optimization processing flow according to Embodiment 3.

Next, referring to FIGS. 14 and 15, the optimization processing according to Embodiment 3 will now be described. FIGS. 14 and 15 are one part and another part of an example of a flowchart for explaining an optimization processing flow according to Embodiment 3. The optimization processing starts by receiving PDF data (a print job) output by the information terminal device 10 as a trigger. A plurality of optimization processing may be performed in parallel.

The determination unit 26a determines whether or not the PDF data has been received (Step S101). When the determination unit 26a determines that the PDF data has not been received (Step S101; NO), the process repeats Step S101 until the PDF data is received.

On the other hand, when the determination unit 26a determines that the PDF data has been received (Step S101; YES), the data size calculating unit 26b calculates the data size per page of the received PDF data (Step S102).

The eigenvalue calculating unit 26j calculates an eigenvalue which enables unique identification of an image (Step S103), associates the image order and the calculated eigenvalues, and stores them respectively in the eigenvalue managing table T3 (Step S201). Then, the throughput estimating unit 26c estimates the throughput of RIP processing which corresponds to the data size per page calculated by the data size calculating unit 26b using the function F (Step S105).

The determination unit 26a determines whether or not the value of the throughput of RIP processing which is estimated by the throughput estimating unit 26c is less than the threshold M (Step S106). When the determination unit 26a determines that the value of the estimated throughput of RIP processing is greater than or equal to the threshold M (Step S106; NO), the process proceeds to Step S118 which will be described later.

On the other hand, when the determination unit 26a determines that the value of the estimated throughput of RIP processing is less than the threshold M (Step S106; YES), the unit for estimating RIP time before optimization 26d estimates the RIP time per page when the received PDF data is not optimized, on the basis of the data size per page calculated by the data size calculating unit 26b (Step S107).

Referring to the setting table T1, the optimization time estimating unit 26e estimates the optimization time per page on the basis of the data size per page calculated by the data size calculating unit 26b (Step S108).

Referring to the setting table T1, the unit for estimating RIP time after optimization 26f estimates the data size per page after optimization on the basis of the data size per page calculated by the data size calculating unit 26b and estimates the RIP time per page when the received PDF data is optimized, on the basis of the estimated data size per page after optimization (Step S109).

The determination unit 26a determines whether or not the received PDF data is to be optimized, on the basis of the estimated RIP time per page when optimization is not performed, the estimated optimization time per page, and the estimated RIP time per page when optimization is performed (Step S110). When the determination unit 26a determines that the received PDF data is not to be optimized (Step S110; NO), the process proceeds to Step S118 which will be described later.

On the other hand, when the determination unit 26a determines that the received PDF is to be optimized (Step S110; YES), the identification unit 26k determines whether or not the same eigenvalue as that of the image of the received PDF data is registered in the resolution converted image managing table T2 (Step S111). When the identification unit 26k determines that the same eigenvalue as that of the image of the received PDF data is not registered in the resolution converted image managing table T2 (Step S111; NO), the process proceeds to Step S115 which will be described later.

On the other hand, when it is determined that the same eigenvalue as that of the image of the received PDF data is registered in the resolution converted image managing table T2 (Step S111; YES), the identification unit 26k further identifies the eigenvalue of the image whose resolution was converted during the most recent predetermined time period, from among the same eigenvalues as those of the images of the received PDF data that are registered in the resolution converted image managing table T2 (Step S202).

The determination 26a determines whether or not the eigenvalue has been identified by the identification unit 26k (Step S113). When the determination 26a determines that the eigenvalue has been identified (Step S113; YES), for the images that are among the images of the received PDF data whose eigenvalue has been identified by the identification unit 26k, the optimization processing unit 26g optimizes the received PDF data so that the resolution after conversion is the same as the corresponding resolution that is registered in the resolution converted image managing table T2 (Step S203). Then, the process proceeds to Step S204 which will be described later.

On the other hand, when the determination 26a determines that the eigenvalue is not identified (Step S113; NO), the optimization processing unit 26g optimizes the received PDF data (Step S115). Then, the registration unit 26l extracts the images whose resolution has been converted upon optimization, and among the extracted images, associates the eigenvalues, resolutions after conversion, date and time of conversion, and job name upon conversion of the images whose resolution is not registered in the resolution converted image managing table T2, and registers them respectively in the resolution converted image managing table T2 (Step S204).

For the images among the images extracted by the registration unit 26l whose eigenvalue is registered in the resolution converted image managing table T2, the updating unit 26n updates the resolution, the date and time of conversion, and the job name upon conversion in the resolution converted image managing table T2 (Step S205) Then, the process proceeds to Step S122 which will be described later.

In the processing of Step S106, when the determination unit 26a determines that the value of the estimated throughput of RIP processing is greater than or equal to the threshold M (Step S106; NO), the identification unit 26k determines whether or not the same eigenvalue as that of the image of the received PDF data is registered in the resolution converted image managing table T2 (Step S118). When the identification unit 26k determines that the same eigenvalue as that of the image of the received PDF data is not registered in the resolution converted image managing table T2 (Step S118; NO), the process proceeds to Step S122 which will be described later.

On the other hand, when it is determined that the same eigenvalue as that of the image of the received PDF data is registered in the resolution converted image managing table T2 (Step S118; YES), the identification unit 26k further identifies the eigenvalue of the image whose resolution was converted during the most recent predetermined time period, from among the same eigenvalues as those of the images of the received PDF data that are registered in the resolution converted image managing table T2 (Step S206).

The determination 26a determines whether or not the eigenvalue has been identified by the identification unit 26k (Step S120). When the determination 26a determines that the eigenvalue has not been identified (Step S120; NO), the process proceeds to Step S122 which will be described later.

On the other hand, when the determination 26a determines that the eigenvalue has been identified (Step S120; YES), among the images of the received PDF data, the resolution converter 26m converts the resolution of the image of the eigenvalue identified by the identification unit 26k so as to adjust to the corresponding resolution that is registered in the resolution converted image managing table T2 (Step S207).

For the images whose resolution has been converted by the resolution converter 26m, the updating unit 26n updates the date and time of conversion and the job name upon conversion in the resolution converted image managing table T2 (Step S208). Then, the storing unit 26h stores the PDF data to be processed in the storage for pending jobs 22a (Step S122), and the process ends.

According to the above Embodiment 3, the printing device 20 identifies the same image as the image whose resolution was converted during the most recent predetermined time period from among the images of the received PDF data. Then, when optimization is performed, the printing device 20 optimizes the received PDF data so that for the identified image, the resolution after conversion is the same as the resolution of the corresponding image whose resolution was converted during the most recent predetermined time period. This permits still further preventing the occurrence of a state in which the same images have different resolutions in the PDF data which are received almost at the same time and are thus considered to be relevant to each other.

Further, according to the above Embodiment 3, when optimization is not performed, the printing device 20 identifies the same image as the image whose resolution was converted during the most recent predetermined time period from among the images of the received PDF data. For the identified image, the printing device 20 converts the resolution of the image of the received PDF data so that it is the same as the resolution of the corresponding image whose resolution was converted during the most recent predetermined time period. This further permits preventing the occurrence of a state in which the same images have different resolutions in the PDF data which are received almost at the same time and are thus considered to be relevant to each other.

According to the above Embodiments 1 to 3, a description has been made of an example of PDF data, but the invention is not limited thereto. It may be other forms of print jobs in which throughput of RIP processing becomes reduced as data size per page becomes increased and an optimization for the images included is possible.

Further, according to above Embodiments 1 to 3, the throughput of RIP processing is estimated, and the determination unit 26a determines whether or not the value of the estimated throughput of RIP processing is less than the threshold M. However, the invention is not limited thereto, and for example, the determination unit 26a may determine whether or not the data size per page calculated by the data size calculating unit 26b is greater than a preset threshold. For example, referring to FIG. 3, Sm may be set as a threshold in this case. The reason is that the throughput of RIP processing is reduced with the increased data size per page, which is a relationship between the data size per page and the throughput of RIP processing, as represented in FIG. 3. This permits reducing processing steps.

According to the above Embodiment 3, the most recent predetermined time period may be set by a user.

Moreover, according to the above Embodiment 3, when the image whose resolution was converted during the most recent predetermined time period is included in the images of the PDF data to be processed, the corresponding job name upon conversion which is registered in the resolution converted image managing table T2 may be reported to the user so as to have the user decide whether or not to convert to that resolution. This enables the user to perform conversion of resolution only when the adjustment of resolution of images is required. As a result, it is also possible to improve user convenience.

The operating program to perform the above operations may be stored on a computer-readable recording medium such as a flexible disk, a CD-ROM (Compact Disk-Read Only Memory), a DVD (Digital Versatile Disk), and a MO (Magneto Optical) disk, distributed, and installed in a computer in the printing device 20 so as to perform the processing described above. Moreover, the program may be stored on a disk included in a server on the Internet so as to be downloaded onto the computer by being superimposed on a carrier wave, for example.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although embodiments of the present invention have been described in detail, it should be understood that the various changes, substitutions, and alterations could be made hereto without departing from the spirit and scope of the invention.

What is claimed is:

1. An image processing device comprising:
    a processor which performs a process including:
        determining whether or not a data size per page of a received print job is greater than a preset threshold;
        estimating, when it is determined that the data size is greater than the threshold, (i) a first RIP time per page, which is a time required to RIP (Raster Image Processor) process when a resolution of an image of the print job is not optimized, (ii) an optimization time per page, which is a time required to optimize, and (iii) a second RIP time per page when the resolution of the image of the print job is optimized; and
        optimizing the resolution of the image of the print job based on the first RIP time, the optimization time, and the second RIP time so that each image after conversion has been decreased in resolution at an equal rate.

2. The image processing device according to claim 1, wherein the process further includes identifying, from among the images of the received print job, a same image as an image of other print jobs already optimized when optimization is performed, and
    wherein the optimizing optimizes the received print job so that a resolution of the identified image is the same as that of the image of the other print jobs already optimized.

* * * * *